(12) United States Patent
Haack et al.

(10) Patent No.: US 10,101,149 B1
(45) Date of Patent: Oct. 16, 2018

(54) METHODS TO CONTROL ADHESIVENESS USING TOPOGRAPHY

(71) Applicant: FORD GLOBAL TECHNOLOGIES, LLC, Dearborn, MI (US)

(72) Inventors: Larry Paul Haack, Ann Arbor, MI (US); Shannon Christine Bollin, South Lyon, MI (US); Ann Marie Straccia, Southgate, MI (US); Sabrina Louise Peczonczyk, Ann Arbor, MI (US); Steven J. Simko, Shelby Township, MI (US); Patricia Karen Konopka, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/485,408

(22) Filed: Apr. 12, 2017

(51) Int. Cl.
*G01B 11/30* (2006.01)

(52) U.S. Cl.
CPC ................................. *G01B 11/30* (2013.01)

(58) Field of Classification Search
CPC .... G01N 21/76; G01N 27/301; G01N 27/302; G01N 27/333; G01N 27/36; G01N 1/34; G01N 1/405; G01N 2030/528; G01N 2035/00356; G01N 2035/0486; G01N 21/69; G01N 30/52; G01N 30/6095; G01N 35/025

See application file for complete search history.

(56) References Cited

U.S. PATENT DOCUMENTS

| | | | |
|---|---|---|---|
| 6,208,412 B1 * | 3/2001 | Ladewski | G01N 21/958 356/124 |
| 6,875,303 B2 | 4/2005 | Samurkas et al. | |
| 7,517,561 B2 | 4/2009 | Haack et al. | |
| 7,744,984 B2 | 6/2010 | Haack et al. | |
| 8,048,530 B2 | 11/2011 | Haack et al. | |
| 8,197,909 B2 | 6/2012 | Haack et al. | |

(Continued)

OTHER PUBLICATIONS

Buckley, D., "The Role of Material Properties in Adhesion", 1984, pp. 1-26.

(Continued)

*Primary Examiner* — Michael P Stafira
(74) *Attorney, Agent, or Firm* — Julia Voutyras; Brooks Kushman P.C.

(57) ABSTRACT

Methods and systems are disclosed for analyzing the adhesiveness of enamel frits using topography. One method includes analyzing a topography of a defined area of an enamel frit surface having a plurality of peaks and determining a topographical parameter of the defined area based on peak shape and/or density. The determined topographical parameter may be compared to a threshold value. The method may then include applying an adhesive to the enamel frit and bonding the enamel frit to a substrate if the determined topographical parameter is below the threshold value. The analysis of the topography may be performed using a non-contact profilometer, such as an optical profilometer. In one embodiment, the topographical parameter may be developed interfacial roughness ($S_{dr}$). The method may be integrated into a manufacturing/assembly line for vehicle glass components, such as windshields or side windows.

20 Claims, 5 Drawing Sheets

(56) References Cited

U.S. PATENT DOCUMENTS

| | | | |
|---|---|---|---|
| 8,865,264 B2 | 10/2014 | Haack et al. | |
| 2007/0065582 A1 | 3/2007 | Haack et al. | |
| 2009/0155604 A1 | 6/2009 | Haack et al. | |
| 2010/0055476 A1 | 3/2010 | Haack et al. | |
| 2012/0099106 A1* | 4/2012 | Park | H01L 51/5246 356/364 |
| 2013/0149472 A1 | 6/2013 | Holubka et al. | |
| 2013/0280435 A1 | 10/2013 | Haack et al. | |
| 2014/0203704 A1* | 7/2014 | Lin | H01L 51/5246 313/512 |
| 2014/0240711 A1* | 8/2014 | Matsushita | G01J 3/0205 356/451 |

OTHER PUBLICATIONS

Jiang, Y. et al., "Measurement of the strength and range of adhesion using atomic force microscopy", Extreme Mechanics Letters, 2016, pp. 119-126.

LaMarche, C. et al., "Method of quantifying surface roughness for accurate adhesive force predictions", Chemical Engineering Science, Feb. 2, 2017, 4 pgs., (Abstract Only).

* cited by examiner

METHODS TO CONTROL ADHESIVENESS USING TOPOGRAPHY

TECHNICAL FIELD

The present disclosure relates to methods to control adhesiveness using topography, for example, the adhesiveness of enamel frits for automotive glass.

BACKGROUND

Automotive glass, for example, the windshield and backlite, is typically bonded to the vehicle frame using an adhesive. One example of a common adhesive is a moisture-cured urethane adhesive. The glass may be decorated on the inside perimeter with an enamel frit in order to mask the appearance of the adhesive bead, as well as to protect the adhesive bond to the glass from UV radiation damage. The adhesive may bond directly to the painted body frame and to the glass enamel frit by means of a primer. Examples of primers may include solvent-borne primers and silica primers (e.g., air plasma activated silica primers). A good bond between the enamel frit and the adhesive is important to ensure the glass is well-adhered to the vehicle.

SUMMARY

In at least one embodiment, a method is provided. The method may include analyzing a topography of a defined area of an enamel frit surface having a plurality of peaks; determining a topographical parameter of the defined area based on peak shape and/or density; comparing the determined topographical parameter to a threshold value; and applying an adhesive to the enamel frit and bonding the enamel frit to a substrate if the determined topographical parameter is below the threshold value.

In one embodiment, the enamel frit surface may have a primer coating thereon prior to determining the topographical parameter, in another embodiment, if the determined topographical parameter is below the threshold value, a primer may be applied to the enamel frit prior to applying the adhesive. In one embodiment, the determined topographical parameter is developed interfacial roughness ($S_{dr}$). The threshold value may be 7% or 5% $S_{dr}$. Analyzing the topography may include non-contact profilometry, for example, optical profilometry.

In one embodiment, the method may include analyzing a topography of a plurality of defined areas, determining a topographical parameter of the defined areas, and comparing the determined topographical parameters of each defined area to a threshold value; and applying an adhesive to the enamel frit and bonding the enamel frit to a substrate if the determined topographical parameter is below the threshold value for one or more of the defined areas. The adhesive may be applied if the determined topographical parameter is below the threshold value for a pre-determined percentage of the defined areas.

In at least one embodiment, a system is provided. The system may include a profilometer configured to analyze an enamel frit surface area having a plurality of peaks and generate topography data corresponding thereto; a controller configured to analyze the topography data to determine a topographical parameter of the surface area based on peak shape and/or density; and a robot configured to apply an adhesive to the enamel frit if the determined topographical parameter is below a threshold value.

The controller may be further configured to compare the determined topographical parameter to the threshold value. In one embodiment, the profilometer is a non-contact profilometer, for example, an optical profilometer. The robot may be further configured to bond a glass component having the enamel frit coated thereon to a vehicle frame via the adhesive. In one embodiment, the profilometer may be configured to analyze a plurality of surface areas of the enamel frit and generate topography data corresponding thereto and the controller is configured to analyze the topography data to determine a topographical parameter of the surface areas based on peak shape and/or density and compare the determined topographical parameter of each surface area to a threshold value.

In at least one embodiment, a method is provided. The method may include analyzing a topography of a defined area of an enamel frit surface having a plurality of peaks; determining a topographical parameter of the defined area based on peak shape and/or density; comparing the determined topographical parameter to a threshold value; and applying a material to the enamel frit if the determined topographical parameter is below the threshold value.

In one embodiment, the material applied to the enamel frit is an adhesive. In another embodiment, the material applied to the enamel frit is a polymer over-molding or encapsulation. The determined topographical parameter may be developed interfacial roughness ($S_{dr}$), and the threshold value may be 7% $S_{dr}$.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
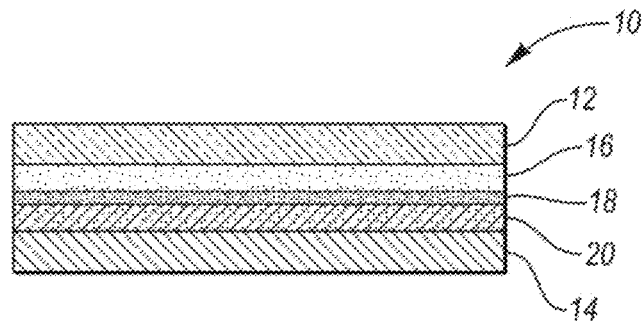
FIG. 1 is a schematic cross-section of a glass assembly, according to an embodiment.

With reference to FIG. 1, a schematic cross-section of a glass assembly 10 is shown. The glass assembly 10 may be an automotive glass assembly, such as a front or rear windshield, side windows, or light assemblies. However, the assembly 10 may represent any glass assembly where a piece of glass is bonded to an underlying substrate. The assembly may include a sheet of glass 12 that is to be bonded to a substrate 14, which may be an automobile frame (painted or unpainted). An enamel frit 16 may be coated on an underside of the glass 12. Enamel frits are known in the art and will not be described in detail. In general, an enamel frit is a layer of fused powdered glass formed by firing. A primer 18 may be applied to the enamel frit 16 to improve the bonding between the enamel frit 16 and an adhesive 20, such as a urethane adhesive (e.g., moisture-cured). The adhesive 20 may then bond to the enamel frit 16 (via the primer 18) and to the substrate 14 (e.g., automobile frame). While the adhesive is shown contacting the substrate 14 directly, the substrate 14 may have a coating thereon, such as paint and/or a primer.

Non-limiting examples of automotive glasses, enamel frits, and primers are disclosed in commonly owned U.S. Pat. Nos. 7,517,561, 8,048,530, 8,197,909, and 8,865,264, the disclosures of which are hereby incorporated in their entirety by reference herein. As described above, the primer 18 may improve the bonding between the enamel frit 16 and the adhesive 20. Non-limiting examples of types of primers include solvent-borne primers, plasma-deposited primers, silica primers, or combinations thereof. Air plasma-activated silica (APASi) primers, and non-limiting examples thereof, are described in the incorporated references.

In general, there are two main types of enamel frits used in automotive glass production. One type of frit is used for glass formed by gravity sag and another is used for glass formed by using a press. In most cases, laminated glass used for the vehicle windshield may be formed by gravity sag, whereas more highly contoured tempered glass used for side windows and backlights may be formed using a press. The tempered glass enamel frit is often specified to have a non-stick surface so that it does not adhere to the press during bending. This is typically accomplished by adding materials to the frit formulation that form crystalline asperities. The asperities may limit contact of the press with the enamel frit to prevent sticking. However, it has been discovered that, as a consequence, the asperities may also limit contact of the adhesive (e.g., a viscous urethane adhesive) with the frit/primer. This may make the surface of the frit considerably more difficult to bond to than frits used on glass formed by gravity sag.

In current manufacturing, the adhesiveness of various frit formulations, for example, from a supplier, is assessed essentially through a trial and error approach using basic experimental testing. The testing is done, therefore, without a fundamental understanding of the critical surface properties that determine adhesion. An investigation was performed to determine these critical surface properties and to generate methods for improving and controlling adhesion between the enamel frit and the adhesive.

Figure 2:
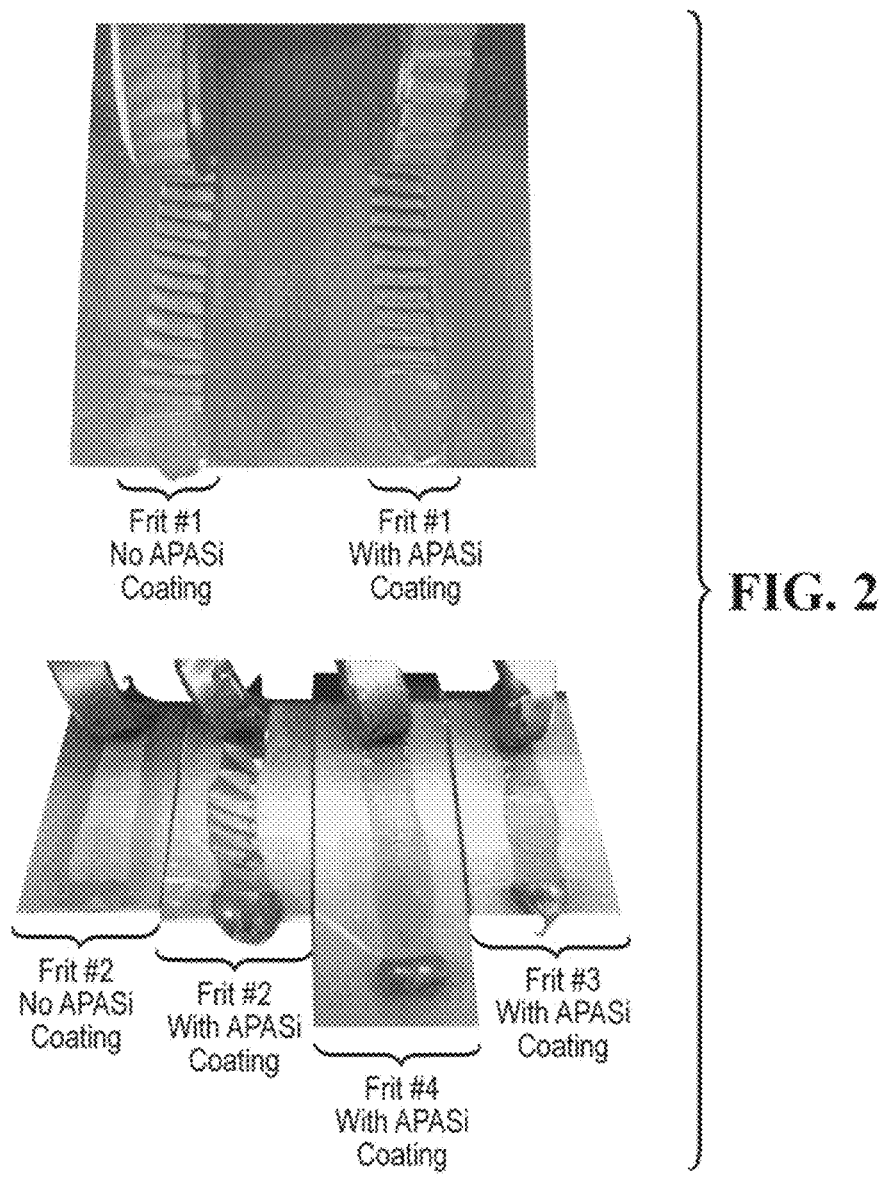
FIG. 2 shows the results of adhesion testing for several enamel frits having common surface chemistry.

During the investigation, it was initially noted that robust bonding was consistently realized for air plasma-activated silica (APASi) primed gravity sag enamel frits. However, APASi primed press formed glass fits yielded different bonding results depending upon how the underlying frit was processed. When processed by a first manufacturer, the results were positive, but when processed by a second manufacturer, the results were negative (bond failure). For example, when an enamel formulation that was supposed to be identical to the positive test result was processed by the second manufacturer, bond failure occurred at the urethane/APASi primer interface. That is, de-bonding did not occur between the APASi primer and the enamel frit, but instead between the silica primer and the urethane adhesive. Results of adhesion testing for four different frits are shown in FIG. 2. Frits #1 and #2 were tested with and without the APASi primer. The adhesion tested was performed using a quick knife adhesion (QKA) method according to Ford Laboratory Test Method BU 154-01. The adhesive used was Betaseal 16605, a silane-modified urethane from Dow Automotive Systems in Auburn Hills, Mich. As shown, in FIG. 2, fits #1 and #2 had good (passing) adhesion, while frits #3 and #4 had poor (failing) adhesion.

Chemical composition analysis was performed to determine whether the differences in adhesion noted could be attributed to chemistry. Surface analysis by X-ray photoelectron spectroscopy (XPS) was conducted on four different frits having APASi primer coatings, each primer having the same target composition. The XPS results for the APASi coatings applied to frits #1-4 are shown in Table 1, below. No trace of bismuth (Bi) was observed from the underlying enamels, indicating that the elemental compositions measured were attributed purely to the applied APASi coating. The carbon (C) observed was attributed partially to adventitious contamination deposited from exposure to the atmosphere, while a portion of the C and the elements silicon (Si) and oxygen (O) are native to the APASi coating. In all cases the frit surface chemistry is substantially and effectively identical, defined by the applied APASi primer coating.

TABLE 1

| Enamel Frit | Primer Compositions XPS Composition—At.-% | | |
|---|---|---|---|
| | C | O | Si |
| #1 | 18.3 | 55.7 | 26.0 |
| #2 | 18.8 | 54.5 | 26.7 |
| #3 | 18.9 | 54.5 | 26.6 |
| #4 | 18.5 | 54.8 | 26.7 |

Thus, the differences in adhesion for frits #1-2 and #3-4 could not be attributed to chemistry. It was hypothesized that, instead, the differences in adhesion were due to the physical nature of the surface, such as the topography. The APASi coating is very thin relative to the enamel frit, for example, on the order of tens of nanometers while frit surface roughness measurements are on the order of microns (see, e.g., incorporated U.S. Pat. No. 8,865,264 and U.S. Pat. No. 8,197,909). Therefore, while changing and commonizing the overall surface chemistry, the APASi primer itself has a negligible effect on the overall surface topography of the enamel frits.

However, initial attempts to correlate surface topography to adhesion were also unsuccessful. Surface topography over a defined area is commonly quantified by average roughness, $S_a$, an amplitude measuring parameter that represents the average roughness integrated over a 3D surface, calculated by equation (1), below:

$$S_a = \frac{1}{A} \int \int_A |Z(x, y)| dx dy \qquad (1)$$

In equation (1), the function Z(x,y) is the absolute height Z of the surface relative to the best fitting plane for coordinates (x,y) within the area of measurement A. It should be noted that $S_a$ is the average surface roughness over an area, the 3D version of the more commonly recognized $R_a$, which is the average roughness over a line (2D).

In general, the conventional wisdom is that roughening a surface, such as by means of grit blasting or mechanical sanding, is thought to enhance adhesion by increasing the amount of bondable surface area. In this case, an increase in $S_a$ should correlate with an increase in adhesive bond strength. Based on the QKA method, the results of which are shown in FIG. 2, the adhesiveness of the frits coated with APASi primer were, in order from high to low, #1>>#2>#3 #4. Frits #1 and #2 were considered to have good/passing adhesion, while frits #3 and #4 exhibited poor/failing adhesion.

Figure 3:
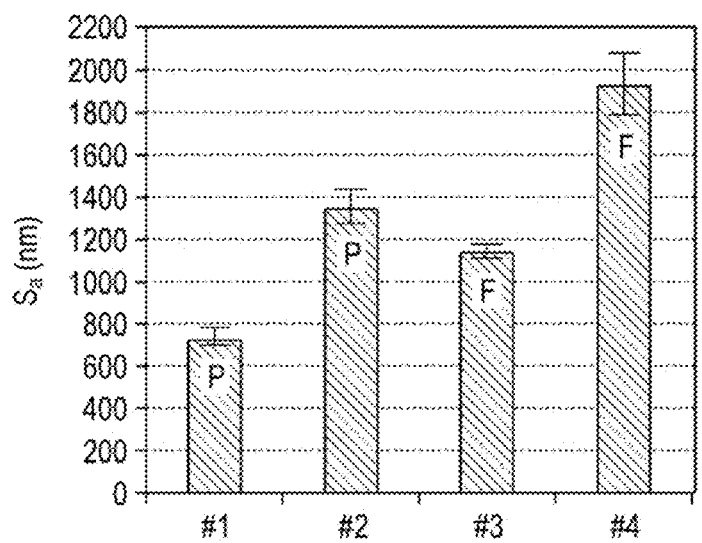
FIG. 3 is a plot of average roughness $S_a$ for the enamel frits of FIG. 2.

Based on these results, it would be expected that frits #1 and #2 had a relatively high $S_a$ value, while frits #3 and #4 had a relatively low $S_a$ value. FIG. 3 shows the average $S_a$ value for each frit type. The surface roughness measurements ($S_a$ value) determined by optical profilometry were, from high to low, #4>#2>#3>#1. Accordingly, this data for surface roughness shows no correlation to the measured adhesiveness of the APASi primed frits. Thus, the levels of adhesion noted for the set of four enamel frits could not be explained by either chemistry or topography as defined by $S_a$.

While it is the most commonly utilized surface roughness parameter, $S_a$ values do not capture the entire nature of the topography of the enamel frits, as it pertains to surface adhesion. $S_a$ only captures height information and is lacking in spatial information, such as frequency of peaks and valleys. As described above, certain enamel frits, such as press bend formed glass enamel frits, may contain crystalline asperities that limit contact of the press to prevent sticking. Consequently, it was hypothesized that the asperities may also impede surface contact of a viscous adhesive. This would make press bend formed glass enamel frits more difficult to bond. The urethane adhesive that is currently used to bond glass to the automotive frame is highly viscous and may not be able to fully wet the surface of the primed frit to make intimate contact therewith, thereby limiting the formation of important chemical and mechanical bonds.

It was discovered that a different surface parameter, $S_{dr}$, may more accurately describe a surface topography containing regions of disruptive asperities. $S_{dr}$ is the developed interfacial roughness, a hybrid parameter that accounts for both amplitude and frequency. $S_{dr}$ is a measure of the percent of additional surface area due to texture when compared to an ideal flat plane in the definition area. $S_{dr}$ may be calculated by equation (2), below:

$$S_{dr} = \frac{1}{A}\left[\int\int_A\left(\sqrt{1+\left(\frac{\partial z(x,y)}{\partial x}\right)^2+\left(\frac{\partial z(x,y)}{\partial y}\right)^2}-1\right)dxdy\right] \quad (2)$$

Figure 4:
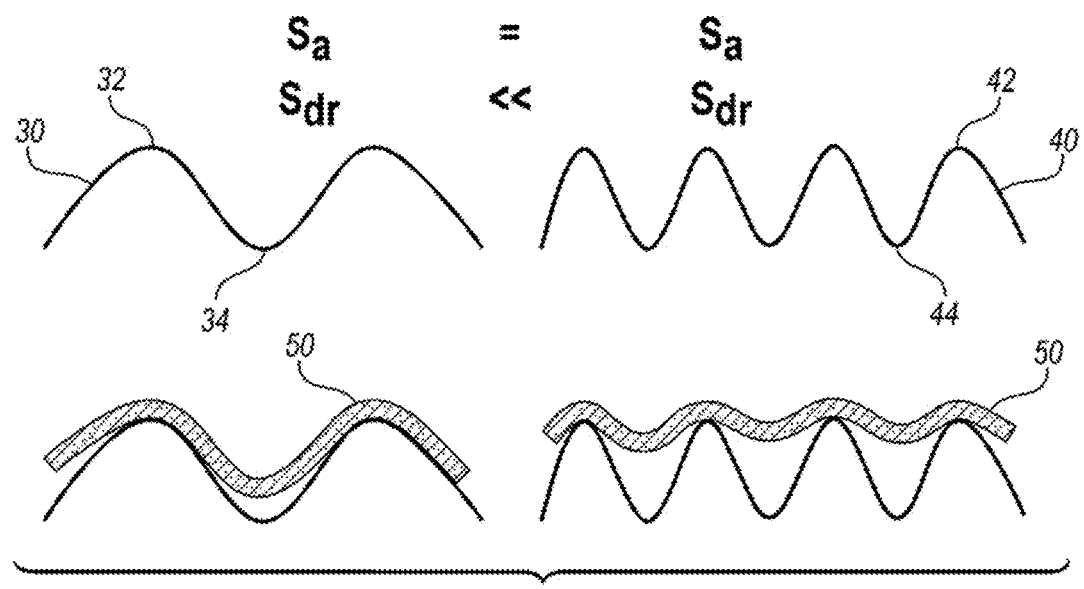
FIG. 4 is a schematic representation of two surfaces having the same average roughness ($S_a$) but different developed interfacial roughness ($S_{dr}$) and the impact on an applied adhesive, according to an embodiment.

As it applies to bonding an enamel frit to an adhesive, $S_{dr}$ may reflect the amount of bondable surface area that is lost in the regions of the frit with asperities that limit contact with an applied viscous adhesive. A schematic depiction of the difference between $S_{dr}$ and $S_a$ is shown in FIG. 4. The left surface 30 has fewer, wider peaks 32 and valleys 34, while the right surface 40 has a higher frequency of peaks 42 and valleys 44. The two surfaces shown exhibit dissimilar topographies, yet possess identical $S_a$ values (peak to valley distance). However, the topography difference is captured with the parameter $S_{dr}$. Without being held to any particular theory, it is believed that an adhesive 50 with high viscosity will have better contact with the surface possessing the lower $S_{dr}$ value. The adhesive 50 will only contact the tips of the peaks of the surface with the higher $S_{dr}$ value (e.g., the peaks 42 of the right surface 40), limiting the opportunity for chemical bonds to link up with the frit surface. In contrast, a surface with a relatively low $S_{dr}$ value (e.g., left surface 30) may allow for a highly viscous adhesive 50 to contact not only the tips of the peaks, but a large portion of the surface in between the peaks. For a surface with a very low $S_{dr}$ value, a viscous adhesive may be able to contact all, or substantially all, of the surface.

Figure 5:
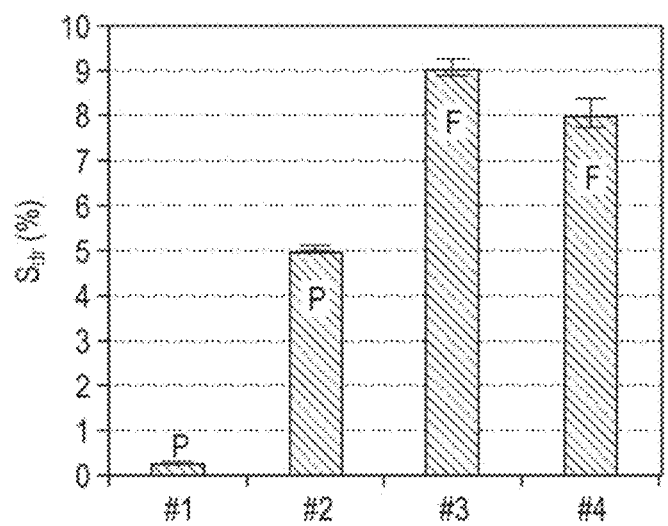
FIG. 5 is a plot of developed interfacial roughness ($S_{dr}$) for the enamel frits of FIG. 2.
Figure 6:
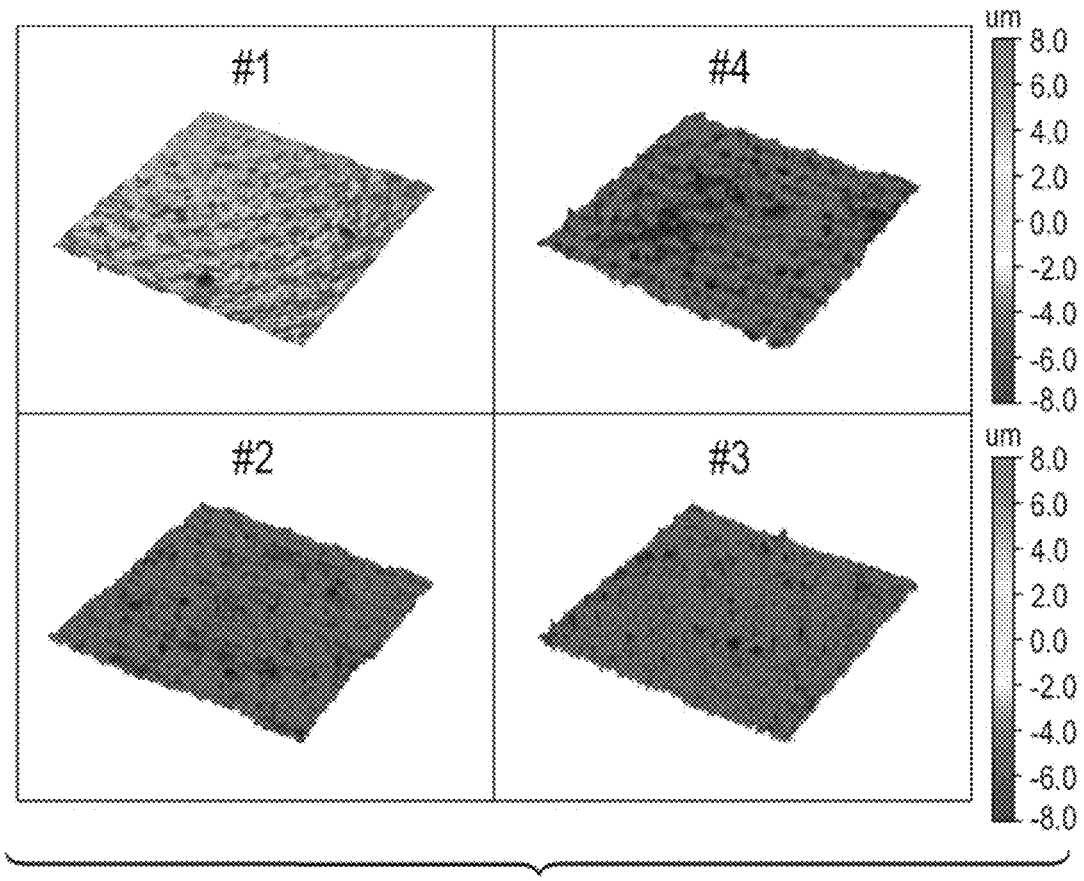
FIG. 6 shows topographical plots of the enamel frits of FIG. 2, illustrating the different levels and types of asperities.

With reference to FIG. 5, the $S_{dr}$ values of enamel frits #1-4 are shown. The Sdr values were calculated based on scanning using a Wyko NT3300 Optical 3D Profiling System from the Bruker Corporation. Note there is a clear distinction between the values obtained for the laminate glass frit #1 (% $S_{dr}$ of 0.26) and those obtained for tempered glass frits #2-4 (% $S_{dr}$ from 5 to 9). This difference is quite evident in the topographical plots in FIG. 6, where the press bend enamels of frits #2-4 exhibit sharp asperities that are void in the gravity sag enamel frit #1. The graph in FIG. 5 shows that the APASi coated frits #3 and #4 that failed the QKA test exhibited the highest $S_{dr}$ values.

Comparatively, the $S_{dr}$ values were, in order from low to high, #1<<#2<#3 #4. These values correlate closely with the results of the QKA tests with the urethane adhesive, in that the frit with the lowest $S_{dr}$ value, and hence the highest percentage of surface area in a flat ideal plane, exhibited the best bond strength to the urethane adhesive. The results also establish that the reason the APASi coated fit #2 exhibited better bonding than the APASi coated frit #3, both containing the same formulation, can be linked to the fact that it contained more usable surface area that was available for bond linkup to the adhesive. It is hypothesized that the differences noted between frits #2-4 were due to differences in processing.

Accordingly, the investigation discovered that there exists an upper limit or threshold value for the surface topography parameter, $S_{dr}$, that differentiates pass from fail for bonding an adhesive to glass enamel frits having a commonized surface chemistry. The investigation was performed using a relatively viscous urethane adhesive and an APASi primer coating, however, the discoveries apply to other adhesive types and relative viscosities. For example, a less viscous adhesive may be better able to flow into the space or valleys between asperities in a frit having a higher $S_{dr}$ value. Accordingly, the threshold $S_{dr}$ value may be higher for a less viscous adhesive, other variables being held constant. Similarly, different adhesive types may require more or less bonding area than other adhesives. Therefore, the threshold $S_{dr}$ value may be different for different adhesive types (e.g., urethane vs. silicone). Other materials may also be bonded to enamel frits, such as polymer over-moldings and encapsulations. Non-limiting examples of such materials may include polyurethanes (PU) and polyvinyl chlorides (PVC). These materials may be applied on top of a primed fit on, for example, a moonroof, side glass, or other glass components on a vehicle (or other application).

Figure 7:
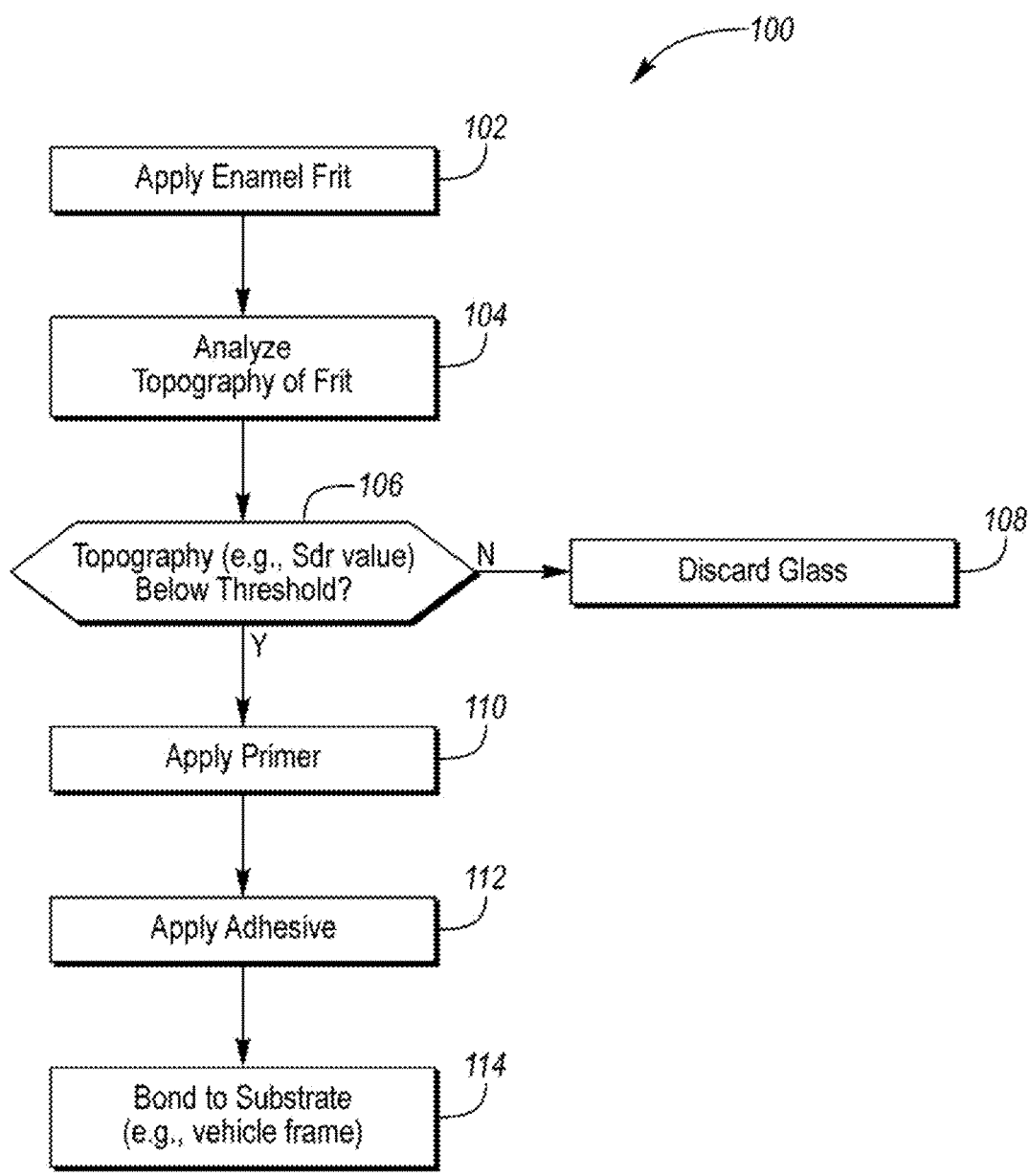
FIG. 7 is an example flowchart of a method for analyzing the topography of an enamel frit on a piece of glass and determining whether or not to discard the piece of glass or bond it to a substrate based on the topography.

With reference to FIG. 7, an example flowchart 100 is shown for a method of using the disclosed topography analysis. The method may be used in a manufacturing or assembly line, in a quality control process, or other situations where it is important to know whether a certain piece or batch of glass components will successfully bond to a substrate (e.g., via a frit). The method may be used as feedback control to define a correct processing window that enables robust adhesion to enamel frits. The method may be particularly effective for analyzing press bend formed glass. The disclosed investigation provides the foundation for a predictive model that correlates and plots adhesive viscosity values against frit $S_{dr}$ values, and defines a critical region within the plot where robust adhesion can be realized. The findings can be extrapolated to any commonized surface chemistry and for any adhesive.

In step 102, an enamel frit may be applied to a piece of glass. The glass may be any type of glass, such as automotive glass. In one embodiment, the glass may be laminated or tempered glass. The glass may have been formed/shaped by any suitable method, such as gravity sag or press bending. The enamel frit may be applied on select portions of the glass, for example, in regions where an adhesive will be applied to secure the glass to a substrate, such as a vehicle frame.

In step 104, the topography of the enamel frit may be analyzed. Steps 102 and 104 may be performed by the same entity or by different entities. In some embodiments, a supplier may apply the enamel frit to the glass and an original equipment manufacturer (OEM) may purchase the glass from the supplier. In other embodiments, the OEM may apply the enamel frit and perform the analysis. In still other embodiments, the supplier may apply the enamel frit and perform the analysis. In embodiments where the supplier applies the frit and the OEM performs the analysis, there may be an additional step between the application and the analysis wherein the OEM receives the glass with the frit applied. Similarly, if the supplier applies the enamel frit and performs the analysis of the topography, there may be a receiving step by the OEM after the analysis is done.

The analysis of the topography in step 104 may include determining the $S_{dr}$ value, the developed interfacial roughness, or another topographical parameter of the enamel frit that relates to surface area and/or peak frequency. The $S_{dr}$ value is described above, as well as an example equation (eq. 2) for calculating the $S_{dr}$ value. The $S_{dr}$ value, or other topographical parameters, may be determined using a profilometer to measure the surface profile of the frit (e.g, profilometry). In one embodiment, the topographical parameter may be determined using a non-contact profilometry technique. The non-contact technique may include optical profilometry, wherein a beam of light directed to the surface to be measured and the reflected light is compared to that of a reference surface and the interference fringes created are used to determine a surface profile. Any type of optical profilometer may be used that is capable of determining the $S_{dr}$ value, or other topographical parameters. Similarly, any other non-contact technique may be used, such as focus detection methods or pattern projection methods.

Contact methods may also be used, provided they do not damage or alter the enamel frit. Examples of contact profilometry may include stylus profilometry and scanning probe microscopy (SPM). Specific techniques disclosed above are merely examples, and are not intended to be limiting. $S_{dr}$, and any other surface roughness parameters, may be calculated using native software, such as software stored on the scanning device or an associated computer system, or 3rd party software. The scanning device (hardware) and the software used to calculate the topographical parameters need not be associated with each other, nor does the calculation/analysis by the software need to be performed during or immediately following the physical scanning.

The topography analysis performed in step 104 may be a three-dimensional (3D) analysis, in which the surface roughness is determined over an area of the sample. In other embodiment, the analysis may be a 2D analysis over a line. Regardless of the type of analysis performed, the resulting value may be a single measurement or an average of multiple measurements. For example, an area (or line) of the enamel frit may be measured once or it may be measured multiple times and averaged, such as three, five, or ten times. In addition to (or instead of) measuring a single area (or line), multiple areas of the enamel frit may be measured (either once or multiple times). If multiple areas are measured multiple times, an overall average value may be determined.

As described above, in some embodiments the topographical parameter that is analyzed may be a $S_{dr}$ value, the developed interfacial roughness. There may be other topographical or roughness parameters that convey similar information to the $S_{dr}$ value. Other parameters that account for more than just peak height may therefore also be used in the disclosed systems and methods. The parameters may be those in which the peak shape, peak density, and/or surface area are analyzed. Some of these parameters may be referred to as hybrid parameters, which factor in the amplitude/height and spacing of peaks/valleys. Other parameters may be amplitude, spatial, bearing, or functional surface roughness parameters.

In one embodiment, the analysis of the topography in step 104 may include determining the slope of the surface profile, referred to as Δq. This may represent another hybrid roughness parameter that is a quantitative assessment of the rate of change of the surface heights over the profile length or the average wavelength weighted by amplitude. The slope may therefore represent the "sharpness" of the peaks on the surface as well as their frequency. The slope may be measured in milliradians (mrad) or degrees. Another hybrid parameter that may be used is $S_{dq}$, the root mean square gradient of the scale-limited surface. An example of a spatial parameter that may be used is $S_{al}$, autocorrelation length. Non-limiting examples of functional parameters may include $S_{mr}(c)$, areal material ratio of the scale-limited surface, and $S_p k$, reduced peak height.

Other topographical parameters may also be used, such as $S_p a$, density of peaks, $S_{pc}$, arithmetic mean peak curvature, or the surface area of a defined area. Accordingly, there may be multiple surface roughness parameters that can capture similar types of information as the $S_{ch}$ value. The parameters identified above, as well as other surface roughness parameters, are defined in, for example, ISO 25178-2 "Geometrical product specifications (GPS)—Surface texture: Area 1-Part 2: Terms, definitions and surface texture parameters," the disclosure of which is hereby incorporated in its entirety by reference herein. In addition to, or instead of, using the above parameters, the data may be filtered prior to calculating parameters in order to provide similar information.

In step 106, the measured or determined topography from step 104 may be compared to a threshold value. The threshold value may be of any type of topographical parameter that corresponds to an amount of bondable surface area that is available to contact an applied adhesive. This may be a $S_{dr}$ value or it may be another type of topographical parameter, such as one of the disclosed hybrid, spatial, or functional parameters (or others).

As described above, it has been found that at a certain $S_{dr}$ value, the adhesive may lack sufficient contact area with the enamel frit surface to form a sufficient bond therewith. The particular $S_{dr}$ value threshold or upper limit may vary depending on the type of adhesive, the viscosity of the adhesive, the desired bond strength, or other factors. In at least one embodiment, the $S_{dr}$ threshold may be at most 10%, for example, at most 8%, 7%, 6%, or 5%. In another embodiment, the $S_{dr}$ threshold may be from 0.1 to 10%, or any sub-range therein, such as 0.1 to 7%, or 0.1 to 5%. In at least one embodiment, the above values may apply for a urethane adhesive. In one embodiment, the viscosity of the urethane adhesive (or other adhesives/bonding materials) may be from 0.75 to 1.70 Pa·s at 23° C., or any sub-range therein, such as 1.00 to 1.45 Pa·s. In general, a lower viscosity adhesive may have a higher $S_{dr}$ threshold, other variables being held constant.

While the threshold values described above refer to a $S_{dr}$ value, similar threshold values may apply for other topographical parameters. However, one of ordinary skill in the art will understand that, based on the present disclosure, threshold values may be determined for the other topographical parameters. For example, the slope or Δq parameter may have an upper limit value of 220 mrad to form an acceptable bond. In one embodiment, the threshold value may be determined (e.g., empirically/experimentally) by identifying a value at which the failure mode switches from bond failure within the adhesive to failure somewhere else in the assembly (e.g., bond failure between the adhesive and the primer). The threshold value for the topographical parameter may be set at this identified value, or a certain safety factor below said value.

In another embodiment, the comparison in step 106 may be based on the percent of area of the enamel frit surface that is available to bond to the adhesive. As used herein, "available to bond" may mean that the surface is able to be contacted by the adhesive. As described above and shown in FIG. 4, not all of the surface of the enamel frit may be reachable by the adhesive (e.g., due to the viscosity). Accordingly, the comparison in step 106 may analyze whether a certain minimum threshold of the surface area of the enamel frit is available to bond to the adhesive. The available area may be calculated based on the $S_{dr}$ value and the properties of the adhesive, such as the viscosity. In at least one embodiment, the minimum threshold of the enamel frit surface area that is available to bond to the adhesive may be at least 25%, for example, at least 35%, 50%, 65%, or 75%.

As described above, the topography measurements/calculations may be performed on one area or multiple areas and may be performed a single time per area or multiple times per area. If there are multiple measurements, they may be averaged (e.g., per location, per sample, or both). The comparison in step 106 may be based on any of the measurements/calculations, depending on the level of certainty desired. In one embodiment, the comparison may fail if any calculated $S_{dr}$ value is above the $S_{dr}$ value threshold. For example, there may be three areas/regions analyzed and each area may be analyzed five times, for a total of 15 $S_{dr}$ value data points. In this embodiment, if any of the 15 $S_{dr}$ values are above the $S_{dr}$ value threshold, the comparison may indicate a failure. In another embodiment, the average $S_{dr}$ value for a particular area may be compared to the $S_{dr}$ value threshold or the average overall $S_{dr}$ value for all the data points may be compared to the $S_{dr}$ value threshold. In another embodiment, there may be a certain number of data points above the $S_{dr}$ value threshold that are acceptable, such as one, two, three, or some other number, wherein the number may depend on the total number of data points. Similarly, there may be a certain percentage of data points above the $S_{dr}$ value threshold that are acceptable, such as up to 5%, 10%, or 15%.

If the comparison in step 106 results in a "no" or "fail," based on the definition of a pass or fail described above, then the piece of glass may be discarded in step 108. If the glass is being analyzed as it traverses a manufacturing or assembly line, the glass may be removed from the line. The removal may be automatic, such as by a robot, in response to a "fail" signal or alarm, or it may be manual by a worker. A failed comparison may result in an alarm or other indicator, which may be audible and/or visual or may be a flag in software that performs the comparison or that operates the line. The discarded glass may be partially or completely recycled. For example, the portion without the enamel frit may be sectioned off and used for another purpose or the entire glass piece may be melted down or otherwise reused or recycled. If the glass was analyzed during a quality control or assessment process (e.g., not on a manufacturing/assembly line), it may be similarly recycled or reused. Alternatively, it may be kept as an example of a failed sample or sent to the supplier for additional analysis. In another embodiment, The glass may be quarantined based on a batch code to prevent a line shutdown, quality issues, and associated costs. The glass supplier could then check their process parameters and controls for that batch code and/or a given time period.

If the comparison in step 106 results in a "yes" or "pass," based on the definition of a pass or fail described above, then the piece of glass may continue in the process in step 110. The enamel frit portion of the glass may receive a primer coating during step 110. The primer coating may be any suitable type of primer, such as a plasma-activated primer (e.g., APASi), a solvent-borne primer, or others. The primer may be applied to only the enamel frit, for example, by means of robotics where the path program is precisely defined by the path of subsequent adhesive application, alternatively refined using masks or other patterning techniques, or manually (e.g., as is often the case with solvent-borne primers). While the primer is shown and described in flowchart 100 as being in a step after the topography analysis, it may also be performed prior to the analysis. As described above, certain primers, such as the APASi primer, may have a very small thickness compared to the scale of the surface roughness and the primer may therefore be conformal to the surface of the enamel frit such that it does not significantly affect the topography. Accordingly, the topography analysis may be performed after the primer coating is applied and the results will be substantially the same. It may be more cost effective to determine whether a piece of glass will pass or fail prior to applying the primer coating, however, there may be situations where it is more practical to apply the coating before the topography analysis.

In step 112, the glass having an enamel frit with a primer coating thereon may receive an adhesive. The adhesive may be any suitable adhesive for bonding the enamel frit (via the primer) to the substrate. In one embodiment, the adhesive may be a urethane adhesive. One suitable example may be a relatively viscous, moisture-cured silane-modified urethane adhesive, such as Dow Betaseal 16605. Other adhesives may also be used, such as silicone-based adhesives. Alternatively, the adhesive may be replaced by polymer over-moldings or encapsulations. Non-limiting examples of such materials may include polyurethanes (PU) and polyvinyl chlorides (PVC). These materials may be applied on top of a primed frit on, for example, a moonroof, side glass, or other glass components on a vehicle (or other application). In step 114, the glass may be bonded to the substrate by the adhesive or over-molding/encapsulation. Depending on the type of adhesive, this step may include heating, applying electromagnetic radiation (e.g., UV light), exposure to air or other substances (e.g., catalysts), or other processes to cure the adhesive.

Accordingly, systems and methods for analyzing an enamel frit to determine whether it will successfully bond to an adhesive based on topography are disclosed. Equipment for analyzing the topography, such as an $S_{dr}$ value, may be incorporated into a manufacturing or assembly line. The topography may be analyzed as the glass is moving from one station to another, for example, on a conveyor belt or in storage racks. The analysis may therefore be added to the line with little or no impact to the timing of manufacturing/assembly. The topography analysis may be performed using a non-contact method, such as by optical profilometry. In one embodiment, an optical profilometry system may be used to scan one or more areas of an enamel frit as it moves on an assembly/manufacturing line. The optical profilometry system may include an optical measuring system and a computer system including a processor and software. The computer system may be configured to receive optical scanning information from the optical measuring system and analyze it to determine the topography of the scanned area (e.g., an $S_{dr}$ value).

In some embodiments, the computer system may be part of, or in communication with, a computer system that operates or controls a manufacturing/assembly line for bonding the glass to a substrate (e.g., automotive glass to a vehicle frame). The computer system (hardware and/or software) may have stored therein or may receive data corresponding to a threshold topography value, such as a threshold $S_{dr}$ value. The computer system may then compare the measured $S_{dr}$ value or values of a particular enamel frit to the threshold values and make a determination whether the enamel frit passes or fails the comparison. The determination may be based on a single measurement or multiple measurements, as described above. The computer system may be programmed with the threshold value(s) or it may determine the threshold value based on values of the adhesive type and/or adhesive viscosity or other parameters that may be input into the computer system.

If the computer system is part of, or in communication with (e.g., over a network—wired or wireless), a computer system that controls a manufacturing/assembly line, it may remove a piece of glass from the line based on a failed comparison. This may include controlling a robot to remove the piece of glass, diverting the piece of glass to a different location, or other actions that prevent the glass from continuing through the manufacturing/assembly process. If the piece of glass passes the comparison, the computer system may allow it to continue through the line.

Figure 8:
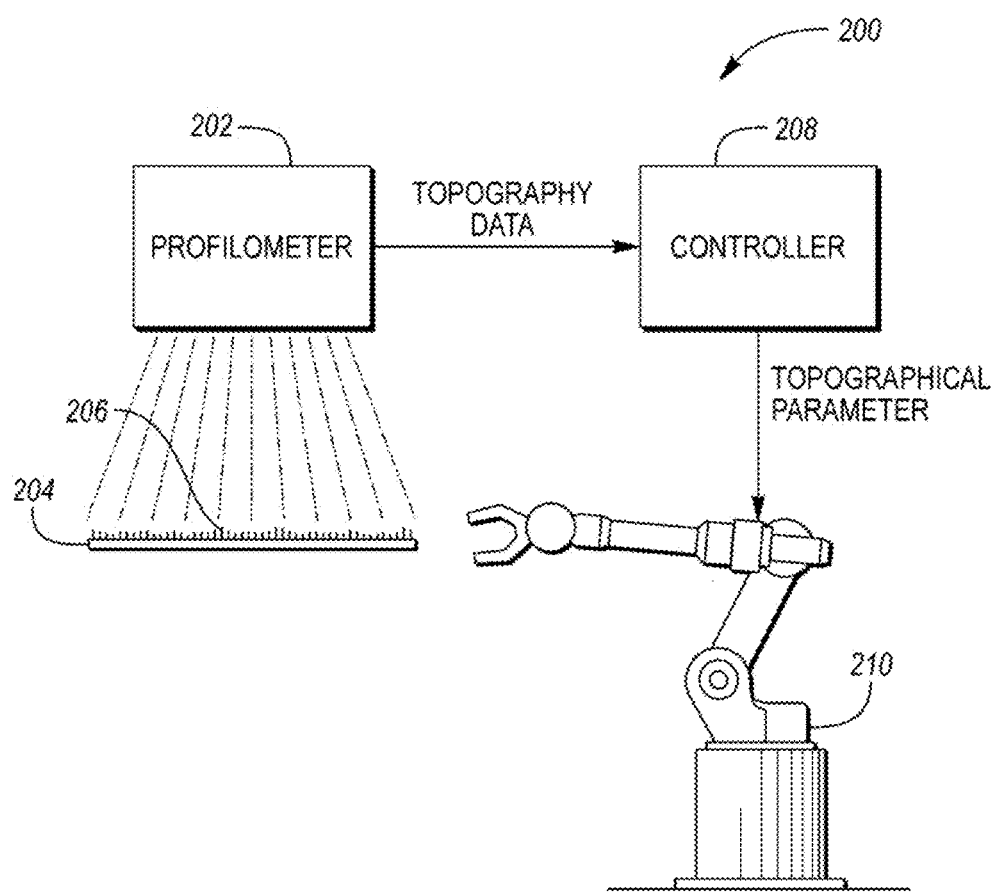
FIG. 8 is a schematic representation of a system for analyzing the topography of an enamel frit on a piece of glass and determining whether or not to discard the piece of glass or bond it to a substrate based on the topography.

In at least one embodiment, as depicted in FIG. 8, a system 200 is provided. The system 200 includes profilometer 202 configured to analyze an enamel flit surface area 204 having a plurality of peaks 206. The profilometer 202 is further configured to generate topography data corresponding to the enamel frit surface area 204. The system 200 also includes a controller 208. The controller 208 is configured to analyze the topography data to determine a topographical parameter of the surface area based on peak shape and/or density. The system 200 also includes a robot 210. The robot 210 is configured to apply an adhesive to the enamel frit if the determined topographical parameter is below a threshold value.

As described previously, portions of the process may be performed in two or more locations, for example, at a supplier location and at an OEM location. One of ordinary skill in the art will understand, based on the present disclosure, that certain steps may be performed at either location and that the order of the steps may differ from those described and shown. Certain steps may also be repeated. For example, the topography of the enamel frit may be tested first by the supplier and then again by the OEM.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method, comprising:
analyzing a topography of a defined area of an enamel fit surface having a plurality of peaks;
determining a topographical parameter of the defined area based on peak shape and/or density;
comparing the determined topographical parameter to a threshold value; and
applying an adhesive to the enamel frit and bonding the enamel frit to a substrate if the determined topographical parameter is below the threshold value.

2. The method of claim 1, wherein the enamel fit surface has a primer coating thereon prior to determining the topographical parameter.

3. The method of claim 1, wherein if the determined topographical parameter is below the threshold value, a primer is applied to the enamel fit prior to applying the adhesive.

4. The method of claim 1, wherein the determined topographical parameter is developed interfacial roughness ($S_{dr}$).

5. The method of claim 4, wherein the threshold value is 7% $S_{dr}$.

6. The method of claim 4, wherein the threshold value is 5% $S_{dr}$.

7. The method of claim 1, wherein analyzing the topography includes non-contact profilometry.

8. The method of claim 7, wherein the non-contact profilometry includes optical profilometry.

9. The method of claim 1, further comprising analyzing a topography of a plurality of defined areas, determining a topographical parameter of the defined areas, and comparing the determined topographical parameters of each defined area to a threshold value; and
applying an adhesive to the enamel frit and bonding the enamel frit to a substrate if the determined topographical parameter is below the threshold value for one or more of the defined areas.

10. The method of claim 9, wherein the adhesive is applied if the determined topographical parameter is below the threshold value for a pre-determined percentage of the defined areas.

11. A system comprising:
a profilometer configured to analyze an enamel frit surface area having a plurality of peaks and generate topography data corresponding thereto;
a controller configured to analyze the topography data to determine a topographical parameter of the surface area based on peak shape and/or density; and a robot configured to apply an adhesive to the enamel frit if the determined topographical parameter is below a threshold value.

12. The system of claim 11, wherein the controller is further-configured to compare the determined topographical parameter to the threshold value.

13. The system of claim 11, wherein the profilometer is a non-contact profilometer.

14. The system of claim 13, wherein the profilometer is an optical profilometer.

15. The system of claim 11, wherein the robot is further configured to bond a glass component having the enamel fit coated thereon to a vehicle frame via the adhesive.

16. The system of claim 11, wherein the profilometer is configured to analyze a plurality of surface areas of the enamel frit and generate topography data corresponding thereto and the controller is configured to analyze the topography data to determine a topographical parameter of the surface areas based on peak shape and/or density and compare the determined topographical parameter of each surface area to a threshold value.

17. A method, comprising:
analyzing a topography of a defined area of an enamel frit surface having a plurality of peaks;
determining a topographical parameter of the defined area based on peak shape and/or density;
comparing the determined topographical parameter to a threshold value; and
applying a material to the enamel fit if the determined topographical parameter is below the threshold value.

18. The method of claim 17, wherein the material applied to the enamel frit is an adhesive.

19. The method of claim 17, wherein the material applied to the enamel frit is a polymer over-molding or encapsulation.

20. The method of claim 17, wherein the determined topographical parameter is developed interfacial roughness ($S_{dr}$) and the threshold value is 7% $S_{dr}$.

* * * * *